Figure 1A:
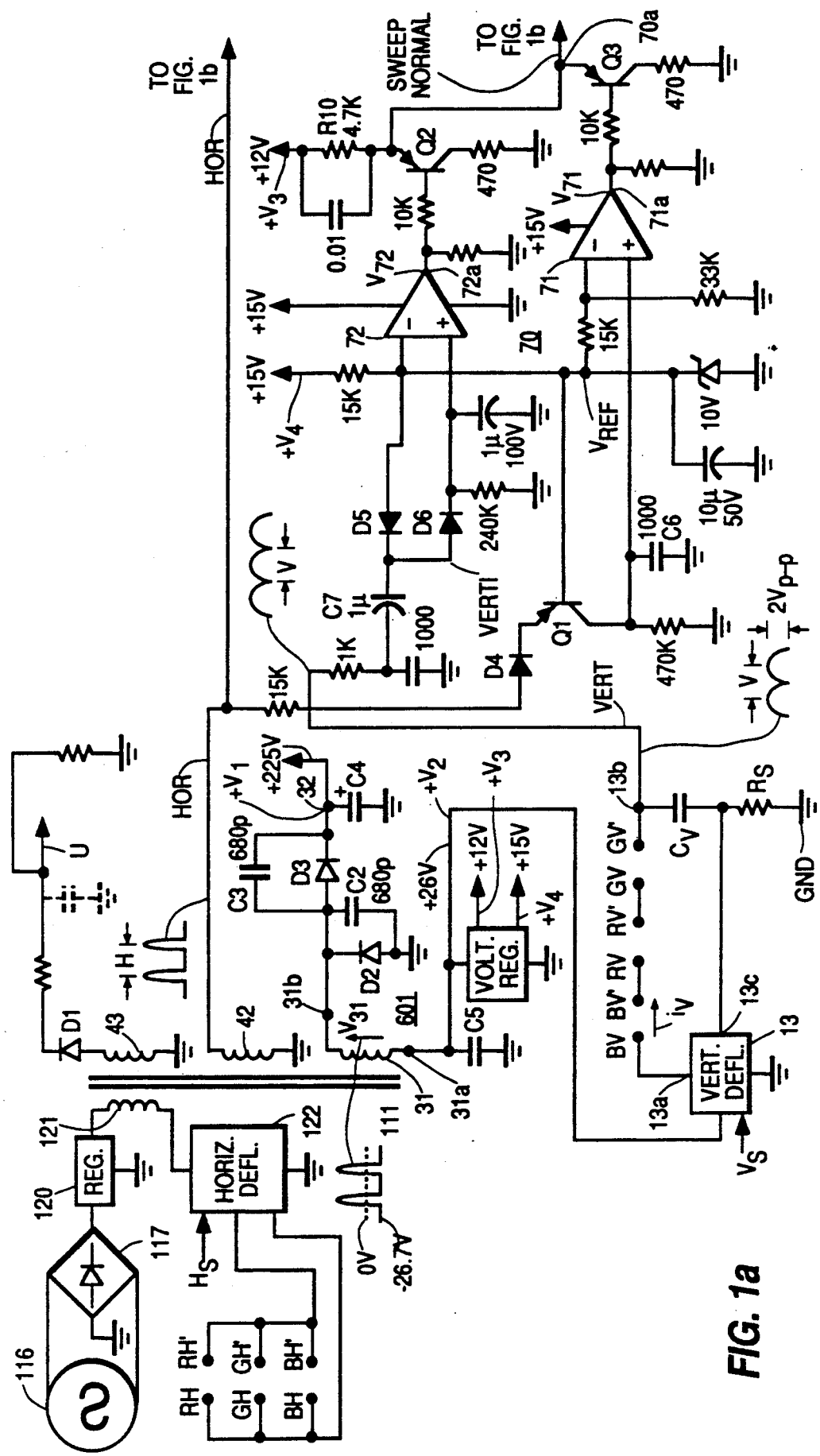

United States Patent [19]

George

[11] Patent Number: 5,036,260

[45] Date of Patent: Jul. 30, 1991

[54] SELF BIASING PROTECTION ARRANGEMENT FOR A CATHODE RAY TUBE

[75] Inventor: John B. George, Carmel, Ind.

[73] Assignee: Thomson Consumer Electronics, Inc., Indianapolis, Ind.

[21] Appl. No.: 516,386

[22] Filed: Apr. 30, 1990

[51] Int. Cl.[5] .......................... G09G 1/04; H01J 29/52
[52] U.S. Cl. ..................................... 315/384; 315/386
[58] Field of Search ............... 315/383, 384, 386, 411; 358/220, 243

[56] References Cited

U.S. PATENT DOCUMENTS

| | | | |
|---|---|---|---|
| 3,810,024 | 5/1974 | Meacham | 328/8 |
| 3,963,961 | 6/1976 | Ray et al. | 315/379 |
| 4,198,661 | 4/1980 | Gatten et al. | 358/242 |
| 4,297,619 | 10/1981 | Kiteley | 315/381 |
| 4,340,910 | 7/1982 | Valdes | 358/220 |
| 4,390,817 | 6/1983 | Johnson | 315/384 |
| 4,404,500 | 9/1983 | Stow | 315/386 |
| 4,488,181 | 12/1984 | Haferl | 358/220 |
| 4,521,720 | 6/1985 | Griffey | 315/386 |
| 4,642,532 | 2/1987 | Hoover | 315/386 |
| 4,660,093 | 4/1987 | Craig | 358/243 |
| 4,677,351 | 6/1987 | Brust et al. | 315/386 |
| 4,749,919 | 6/1988 | Beaumont et al. | 315/386 |
| 4,763,046 | 8/1988 | Sheikholeslami et al. | 315/381 |

OTHER PUBLICATIONS

Pages 1 & 2 of schematic diagram entitled Rear Projection CRT Board, dated 3/25/88 and 1/12/89.
U.S. Pat. Appl. RCA 86,031 entitled A Protection Circuit for a Cathode Ray Tube, in the name of John Barrett George.
U.S. Pat. Appl. RCA 86,033 entitled A Deflection Loss Protection Arrangement for a CRT, in the names of Leroy Samuel Wignot and Lawrence Edward Smith.
Schematic diagram for PV-140/Digital (G) Zenith rear proj. color digital TV receiver, reprinted in Profax, May 1990.
U.S. Pat. Appl. RCA 86,041 entitled Projection TV Deflection Loss Protection Circuit, in the names of Marvin Neil Norman, Lawrence Edward Smith & Peter Ronald Knight.
U.S. Pat. Appl. RCA 85,651 entitled Video Display Apparatus with Kinescope Spot Burn Protection Circuit, in the names of Thomas David Gurley and Leroy Samuel Wignot.

Primary Examiner—Gregory C. Issing
Attorney, Agent, or Firm—Joseph S. Tripoli; Joseph J. Laks; Sammy S. Henig

[57] ABSTRACT

A source of kine supply voltage is coupled to a video amplifier that drives a cathode of a cathode ray tube of a projection television receiver via a self biasing diode. When, due to, for example, a fault condition, the kine supply voltage is lost, the self biasing diode decouples the cathode of the cathode ray tube from a supply return terminal of an ultor supply voltage to form a high impedance, low capacitance at the cathode of the cathode ray tube. A beam current develops a self biasing voltage at the cathode of the cathode ray tube that substantially reduces the beam current to provide protection against a damage to a screen of the cathode ray tube.

17 Claims, 2 Drawing Sheets

SELF BIASING PROTECTION ARRANGEMENT FOR A CATHODE RAY TUBE

This invention relates to a protection circuit for a cathode ray tube (CRT).

Projection video display apparatus, such as television receivers, normally include three monochrome cathode ray tubes individually producing red, green and blue images. A magnifying lens assembly is mounted to each of the cathode ray tubes and causes light from the tubes to be reflected from one or more mirrors onto the area of a projection screen, for rear projection-type receivers. The screen transmits some of the light so that an enlarged image formed from the superimposed images from each of the cathode ray tubes is viewable from a position in front of the screen. The screen acts to diffuse the light from the tubes somewhat to increase the audience viewing angle in order to enlarge the acceptable viewing region about the front of the screen.

In order to form a final enlarged image of sufficient brightness that viewing is acceptable under normal room lighting, it is necessary that the individual cathode ray tube be operated at high brightness levels, corresponding to high levels of electron beam current density. Loss or reduction of horizontal or vertical deflection or scan of any or all of the cathode ray tube electron beams will cause an undesirable concentration of electron beam energy over a small region of the phosphor display screen of one or more of the cathode ray tubes. This may cause permanent damage to the display screen if the scan loss or reduction condition persists for even a short time. It is therefore important that some form of protection circuit be provided that quickly senses a loss or reduction of electron beam deflection and responds in an appropriate manner, such as by blanking the electron beam or beams, to prevent damage to the cathode ray tubes. U.S. Pat. No. 4,642,532, in the name of Hoover, entitled, PROJECTION TV DEFLECTION LOSS PROTECTION CIRCUIT, describes the generation of a disabling or blanking signal for the kine drive circuits when a loss of each one of a horizontal deflection and a vertical deflection occurs.

The kine or video drive circuits that drive the cathodes of the CRT's are typically energized by a kine supply voltage in the order of +200 volts. In some prior art arrangements, blanking the beam current has been obtained in response to a blanking signal by disabling an output transistor of the video drive circuit to prevent it from sinking the beam current. As long as the kine supply voltage is sufficiently positive, the cathode voltage of the CRT will be at, for example, the kine supply voltage level having a nominal level that is in the order of +200 volts. A resulting voltage difference between a grid and the cathode of the CRT is thus at a magnitude that is sufficiently large to produce a cut-off condition in the CRT. However, due to, for example, a fault condition, the kine supply voltage may not be generated.

It may be desirable to develop a sufficiently large cathode voltage at the CRT to provide beam current blanking when the kine supply voltage is substantially smaller than the nominal level for preventing screen burn damage to the display screen when deflection loss occurs.

A video display apparatus, embodying an aspect of the invention, includes a cathode ray tube having a cathode electrode and a high voltage electrode. A source of a high voltage that is coupled to the high voltage electrode produces a beam current that flows in the cathode electrode. A video amplifier having a supply terminal to which a second voltage is coupled generates a cathode electrode voltage at the cathode electrode from the second voltage when the second voltage is at a nominal level. A high impedance is developed at the cathode electrode in accordance with a control signal to provide beam current blanking when the second voltage is substantially different from the nominal level.

Figure 1B:
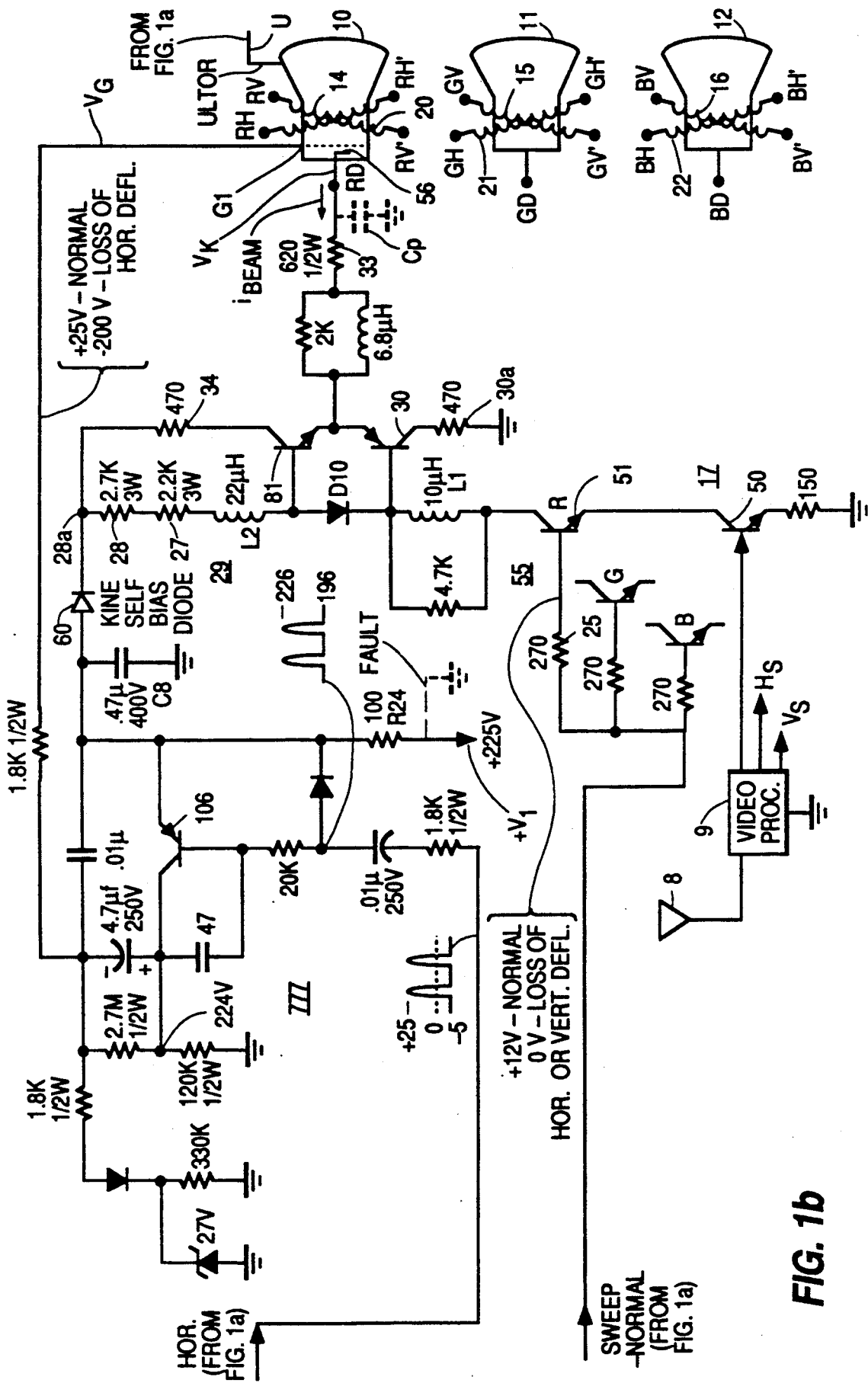

FIGS. 1A and 1B illustrate a block and schematic diagram of a portion of a projection-type video display apparatus incorporating a self biasing protection arrangement, embodying an aspect of the invention, for a CRT.

Referring to the FIGS. 1A and 1B, a projection-type video display apparatus, such as a television receiver, incorporates three monochrome kinescopes 10, 11 and 12. Kinescope or CRT 10 illustratively produces red images, kinescope 11 produces green images, and kinescope 12 produces blue images.

Vertical deflection windings 14, 15 and 16 that are coupled between terminals RV—RV', GV—GV' and BV—BV', respectively, are coupled in series between an output terminal 13a of a vertical deflection circuit 13 and a terminal 13b. A DC blocking capacitor $C_V$ and a current sampling resistor $R_S$ are coupled in series with windings 14, 15 and 16, between terminal 13a an a ground conductor. Circuit 13 produces a sawtooth vertical deflection current $i_v$ that flows in capacitor $C_V$ to produce, during normal operation, a vertical rate signal VERT at terminal 13b that is mainly a parabolic voltage. Should a vertical scan loss occur, for example, when any one of windings 14, 15 and 16 is an open circuit, parabolic signal VERT will not be generated.

A fine rate, or horizontal deflection circuit 122 generates horizontal drive signals at terminal RH—RH', GH—GH' and BH—BH', which are applied to and produce horizontal deflection currents in horizontal deflection windings 20, 21 and 22, respectively. Horizontal deflection circuit 122 is coupled to a primary winding 121 of a flyback or high voltage transformer 111. Winding 121 is energized from a regulator 120 that is energized by a mains supply voltage 116. High voltage transformer 111 includes a load circuit supply winding 31 which, via a diode D3 of a rectifying stage 601, produces a voltage level $+V_1$ at a terminal 32. A nominal level of voltage level $+V_1$ is +225 volts. Voltage level $+V_1$ is DC-coupled to the cathodes of CRT's 10, 11 and 12, as described later on.

During the trace interval of a deflection cycle, a trace voltage $V_{31}$ is developed across winding 31 of flyback transformer 111, in a well known manner. Trace voltage $V_{31}$ is, for example, +26.7 volts. A diode D2 that is poled to be conductive during trace is coupled between a terminal 31b of winding 31 and a ground or common conductor GND. Diode D2 couples trace voltage $V_{31}$ across a filter capacitor C5 for developing a positive voltage level $+V_2$ across capacitor C5 at a terminal 31a of winding 31 to energize vertical deflection circuit 13. Voltage level $+V_2$ is approximately +26 volts. High voltage transformer 111 also includes a winding 42 for developing a retrace pulse signal HOR at the horizontal rate during normal operation of horizontal deflection circuit 122. Additionally, transformer 111 includes a tertiary winding 43 for producing an ultor voltage U that is coupled to an ultor electrode of CRT 10 of CRT 11 and of CRT 12. Ultor voltage U is also coupled via a voltage divider, not shown, to screen electrodes, not shown, of CRT's 10, 11 and 12.

Vertical parabola signal VERT is AC coupled via a capacitor C7 to a cathode of a diode D5 of a fault detector 70. Diode D5 has an anode that is coupled to a DC voltage $V_{REF}$. Consequently, a parabolic voltage VERT1 that is clamped approximately to the level of voltage $V_{REF}$ is developed at the cathode of diode D5. Voltage VERT1 is coupled via a peak rectifier that includes a diode D6 to a noninverting input terminal of a comparator 72. An inverting input terminal of amplifier 72 is coupled to voltage $V_{REF}$. When signal VERT is generated, indicating normal vertical deflection, an output voltage $V_{72}$ at a magnitude that is greater than +12 volts is produced at an output terminal 72a of comparator 72. On the other hand, when vertical deflection loss occurs, voltage $V_{72}$ is approximately zero.

Signal HOR that is indicative of normal horizontal scanning is coupled via a diode D4 to an emitter electrode of a transistor Q1 of fault detector 70. A capacitor C6 is coupled to the collector of transistor Q1 and to a noninverting input terminal of a comparator 71. A noninverting input terminal of comparator 71 is coupled to reference voltage $V_{REF}$. When signal HOR is produced, indicating normal horizontal scanning, an output voltage $V_{71}$ developed at an output terminal 71a of comparator 71 is greater than +12 volts. On the other hand, when signal HOR is missing, that is indicative of a loss of horizontal scanning, voltage $V_{71}$ is approximately zero volts.

Voltages $V_{71}$ and $V_{72}$ are coupled to base electrodes of a pair of transistors Q2 and Q3, respectively. The emitter electrodes of transistors Q2 and Q3 are coupled together at a junction terminal 70a. Terminal 70a is coupled via a resistor R10 in parallel with a video bypass capacitor to a voltage level $+V_3$ that is +12 volts. The collector electrodes of transistors Q2 and Q3 are coupled to ground conductor GND through corresponding arc protection resistors. When either horizontal scan loss or vertical deflection loss occurs, a voltage SWEEP-NORMAL, that is close to zero volts, is developed at terminal 70a. During normal operation, voltage SWEEP-NORMAL is at +12 volts.

A low level video signal is provided by a source 9 to a kinescope driver stage 55. Source 9 includes, for example, conventional video processing stages of a projection television receiver that receives an input signal from an antenna 8. Stage 55 includes an input, common emitter amplifier transistor 50 arranged in a cascode amplifier configuration with a common base amplifier transistor 51. The video signal produced by source 9 is coupled to the base input of transistor 50. Base voltage for transistor 51 at +12 volts is provided through a resistor 25 from voltage SWEEP-NORMAL, during normal deflection operation.

The output circuit of driver stage 55 includes a series arrangement 29 formed by an inductor L1, a diode D10, an inductor L2, a resistor 27 and a resistor 28. Series arrangement 29 forms a collector load at the collector of transistor 51. A high level amplified video signal is developed at the collector of transistor 51. The output circuit of driver stage 55 also includes opposite conductivity type emitter follower transistors 30 and 81 forming a Class B amplifier with base inputs coupled to the collector of transistor 51. The emitter output of transistor 81 is coupled to the emitter output of transistor 30. The high level amplified video signal is coupled from an emitter output of PNP follower transistor 30 or of NPN follower transistor 81, which corresponds to an output terminal of driver stage 55, to a cathode electrode 56 of image reproducing kinescope or CRT 10 via a kinescope arc current limiting resistor 33. A resistor 34 in the collector circuit of NPN follower transistor 81 also serves as a kinescope arc current limiting resistor. Likewise, a collector resistor 30a of transistor 30 acts as a kinescope arc current limiting resistor.

Kine supply voltage level $+V_1$ is coupled to a terminal 28a of stage 55, between series arrangement 29 and resistor 34. Voltage level $+V_1$ is coupled to terminal 28a via a resistor R24 that is coupled to a filter capacitor C8 and via a self biasing diode 60, embodying an aspect of the invention. An arrangement similar to stage 55, not shown, is provided for each of CRT's 11 and 12.

When, for example, a user turns off the power to the television receiver, such, for example, by disconnecting mains supply voltage 116, deflection loss occurs and voltage SWEEP-NORMAL attains a near zero volt level. Voltage SWEEP-NORMAL at near zero volts causes transistors 51 and 30 to become nonconductive. As long as voltage level $+V_1$ is produced, a cathode voltage $V_K$ of CRT 10 is maintained at approximately +225 volts. A grid voltage $V_G$ that is developed at a grid G1 of CRT 10 is maintained at a voltage that is not more positive than +27 volts. The large voltage difference between the cathode and grid of CRT 10 causes a cut-off condition to occur in CRT 10 in which a beam current $i_{BEAM}$ at the cathode of CRT 10 becomes zero. Voltage SWEEP-NORMAL at near zero volts protects CRT 10 against a damage to its display screen by preventing ultor voltage U from producing beam current $i_{BEAM}$.

Assume that immediately after the user turns off the power to the television receiver or due to a fault condition that occurs when the television receiver, is already turned on, voltage level $+V_1$ becomes substantially smaller than its nominal level such as, for example, zero volts. Also assume that ultor voltage U at the ultor terminal or the screen voltage at a screen grid terminal, not shown, of CRT 10 is still at a sufficiently high level to produce beam current $i_{BEAM}$ when voltage level $+V_1$ is substantially smaller than its nominal level. When, for example, the user turns off the television receiver, horizontal and vertical deflection cease and voltage SWEEP-NORMAL becomes zero, as explained before. Consequently, beam current $i_{BEAM}$ that could be produced after the deflection ceases, if not quickly disabled, could cause a damage to the screen of CRT 10.

In accordance with an aspect of the invention, diode 60 becomes back biased when voltage level $+V_1$ is substantially smaller than its nominal level and prevents beam current $i_{BEAM}$ from flowing to ground conductor GND via, for example, capacitor C4 at terminal 32 or via capacitor C8. Therefore, if voltage $V_K$ is at a small magnitude that can produce beam current $i_{BEAM}$, beam or cathode current $i_{BEAM}$ quickly charges a cathode electrode capacitance $C_P$, formed at the cathode of CRT 10, to develop cathode voltage $V_K$ at a large magnitude in a self biasing manner. Voltage $V_K$ causes CRT 10 to be, advantageously, substantially in cut-off or blanking condition. Thus, beam current $i_{BEAM}$ can decrease to substantially zero in a negative feedback manner. Advantageously, the cathode voltage of CRT 10 can increase quickly to provide beam current cut-off because the total capacitive load that is developed at the cathode electrode, including cathode electrode capacitance $C_P$, is small or in the order of 15 picofarad. Thus, diode 60 produces a high output impedance of video driver stage 55 at the cathode electrode of CRT 10 relative to ground conductor GND. The high output impedance that is determined by capacitance $C_P$ provides self bias to CRT 10 that tends to cut-off beam current $i_{BEAM}$. Due to the small value of capacitance $C_P$, the response time for producing the cut-off condition in CRT 10 is, advantageously, short.

For explanation, ignore the operation of a circuit 777 that is described later on. Had capacitors C4 and C8 not been decoupled from terminal 28a of stage 55 through a switch such as diode 60, voltage level $+V_1$ that is significantly smaller from its nominal level might have produced cathode voltage $V_K$ at a smaller level than required to provide beam current blanking. In this case, beam current $i_{BEAM}$ could flow to ground conductor GND through an emitter-base P-N junction of transistor 81, because of an avalanche or breakdown condition in such P-N junction, and through capacitors C4 and C8, for example, or through any other supply load that is coupled to terminal 32 of capacitor C4. Therefore, the cathode voltage of CRT 10 would have been too small to provide blanking of beam current $i_{BEAM}$. Therefore, beam current $i_{BEAM}$ could have caused screen burn damage to the screen of CRT 10.

Grid biasing and cut-off circuit 777 such as, for example, described in a copending U.S. patent application Ser. No. 07/515,513, filed concurrently herewith, entitled A PROTECTION CIRCUIT FOR A CATHODE RAY TUBE, in the name of John Barrett George and incorporated by reference herein is also provided. Circuit 777 maintains grid voltage $V_G$ at about +25 volts during normal operation and causes voltage $V_G$ to be at about −200 volts when signal HOR is not generated. Under various fault conditions circuit 777 provides an additional protection that is capable of blanking CRT 10. For example, if, for some reason, transistor 51 is not maintained disabled, throughout an interval that follows horizontal deflection loss and while ultor voltage U is still sufficiently large to produce a large beam current, then circuit 777 can prevent screen burn damage in CRT 10 during such interval.

What is claimed is:
1. A video display apparatus, comprising:
   a cathode ray tube having a cathode electrode and a high voltage electrode;
   a source of a high voltage coupled to said high voltage electrode of said cathode ray tube for producing a beam current that flows as a cathode electrode current in said cathode electrode;
   a source of a supply, second voltage;
   a video amplifier having an input supply terminal to receive thereat said second voltage that energizes said video amplifier for generating a cathode electrode voltage at said cathode electrode from said second voltage when said second voltage is at a nominal level;
   first means for generating a control signal that is coupled to said video amplifier to disable said video amplifier when blanking of said beam current is required; and
   second means responsive to said second voltage for developing, in accordance with said second voltage, an impedance having a high value at said input supply terminal when said second voltage is substantially different from said nominal level to provide the beam current blanking.

2. An apparatus according to claim 1 wherein said high impedance developing means comprises, means for decoupling said source of said second voltage from said cathode electrode to prevent an output impedance of said source of said second voltage from reducing said high impedance when said second voltage is substantially smaller than said nominal level.

3. An apparatus according to claim 1 wherein said high impedance developing means comprises a switch that is coupled between said supply terminal of said video amplifier and said source of said second voltage for decoupling said source of said second voltage from said supply terminal when said second voltage is substantially smaller than said nominal level.

4. An apparatus according to claim 3 wherein said second voltage is developed in filter capacitor and wherein said switch decouples said filter capacitor from said cathode electrode to reduce a capacitive load at said cathode electrode when said second voltage is substantially smaller than said nominal level.

5. An apparatus according to claim 1 wherein a first transistor of said video amplifier is responsive to said control signal for conducting at least a portion of said cathode electrode current that occurs during normal operation, when said control signal is not generated, and for ceasing conduction when said control signal is generated, during a fault condition.

6. An apparatus according to claim 5 further comprising, a second transistor that is coupled to said first transistor to form a cascode amplifier.

7. An apparatus according to claim 1 wherein said control signal is generated when a deflection loss occurs.

8. An apparatus according to claim 7 wherein said high impedance developing means protects a display screen of said cathode ray tube against a screen burn when said loss of deflection occurs.

9. An apparatus according to claim 1 wherein said high impedance developing means comprises a switch that is coupled between said cathode electrode and said source of said second voltage for decoupling said source of said second voltage from said cathode electrode when said second voltage is substantially smaller than said nominal level.

10. A video display apparatus, comprising:
    a cathode ray tube having a cathode electrode and a high voltage electrode;
    a source of a high voltage coupled to said high voltage electrode of said cathode ray tube for producing a beam current that flows in said cathode electrode;
    a source of a supply, second voltage;
    a video amplifier having an input supply terminal to receive thereat said second voltage that energizes said video amplifier for generating a cathode electrode voltage at said cathode electrode form said second voltage when said second voltage is at a nominal level;
    first means for generating a control signal when blanking of said beam current is required; and
    second means including a self biasing diode responsive to said control signal and to said second voltage for developing a high impedance at said cathode electrode to form said cathode electrode voltage in a self biasing manner that provides the beam current blanking when said second voltage is substantially smaller than said nominal level, and for coupling through said diode said second voltage to said supply terminal of said video amplifier when second voltage is at said nominal level.

11. An apparatus according to claim 10 wherein, after said control signal is generated, a length of an interval that is required for generating said cathode voltage in said self biasing manner at a magnitude that provides the beam current blanking is determined significantly by an electrode capacitance of said cathode electrode.

12. An apparatus according to claim 1 further comprising, a second cathode ray tube that forms with said other cathode ray tube a projection video display apparatus.

13. An apparatus according to claim 1 wherein, when said second voltage is at said nominal level, said second means develops a substantially lower impedance at said cathode electrode and wherein said cathode electrode voltage that is required to provide the beam current blanking is generated from said second voltage.

14. A video display apparatus, comprising:
a cathode ray tube having a cathode electrode and a high voltage electrode;
a source of a high voltage coupled to said high voltage electrode for producing a beam current that flows in said cathode electrode at a magnitude that is determined in accordance with a voltage that is developed at said cathode electrode;
a source of a second voltage;
a video amplifier having a supply terminal to receive thereat said second voltage that energizes said video amplifier for generating said cathode electrode voltage from said second voltage, when said second voltage is at a nominal level;
first means responsive to a control signal that is generated when blanking of said beam current is required for disabling said video amplifier when beam current blanking is required; and
second means responsive to said current that flows in said cathode electrode and to said second voltage for generating said cathode electrode voltage from said current that flows in said cathode electrode in a self biasing manner, when said second voltage is substantially smaller than said nominal level to provide the beam current blanking when said control signal is generated.

15. An apparatus according to claim 14 wherein when said second supply voltage is at said nominal level said cathode electrode voltage is generated from said second voltage to provide the beam current blanking.

16. An apparatus according to claim 14 wherein said second means comprises a switch coupled between said source of said second voltage and said supply terminal of said video amplifier for decoupling said source of said second voltage from said cathode electrode when said second voltage is substantially smaller than said nominal level to develop a high impedance at said cathode electrode.

17. A video display apparatus, comprising:
a cathode ray tube having a cathode electrode and a high voltage electrode;
a source of a high voltage coupled to said high voltage electrode of said cathode ray tube for producing a beam current that flows as a cathode electrode current in said cathode electrode;
a source of a supply, second voltage;
a video amplifier having an input supply terminal to receive thereat said second voltage that energizes said video amplifier for generating a cathode electrode voltage at said cathode electrode from said second voltage when said second voltage is at a nominal level;
first means coupled in a first current path of said cathode electrode current and responsive to a control signal that is generated when blanking of said beam current is required for disabling current flow in said first current path when said control signal is generated; and
second means coupled to said source of said second voltage and to said cathode electrode for coupling said second voltage to said cathode electrode when said second voltage is at a nominal level and for decoupling said source of said second voltage from said cathode electrode to form a high impedance at said cathode electrode when said second voltage is substantially different from said nominal level to provide the beam current blanking.

* * * * *